W. H. HANN.
TIRE.
APPLICATION FILED APR. 18, 1917.

1,251,017.

Patented Dec. 25, 1917.

Inventor
William N. Hann,
By
Attorney

UNITED STATES PATENT OFFICE.

WILLIAM H. HANN, OF MUNDEN, VIRGINIA.

TIRE.

1,251,017.　　　　　Specification of Letters Patent.　　Patented Dec. 25, 1917.

Application filed April 18, 1917. Serial No. 162,907.

*To all whom it may concern:*

Be it known that I, WILLIAM H. HANN, a citizen of the United States of America, and resident of Munden, in the county of Princess Anne and State of Virginia, have invented certain new and useful Improvements in Tires, of which the following is a specification.

This invention relates to pneumatic tires and particularly to attachments for such tires intending to make the same puncture-proof while, at the same time, maintaining the resiliency and efficiency of pneumatic tires now in common use.

A further object of this invention is to produce a puncture-proof tire in which the frictional contact between the tire and the roadbed is of such character as to obviate skidding.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
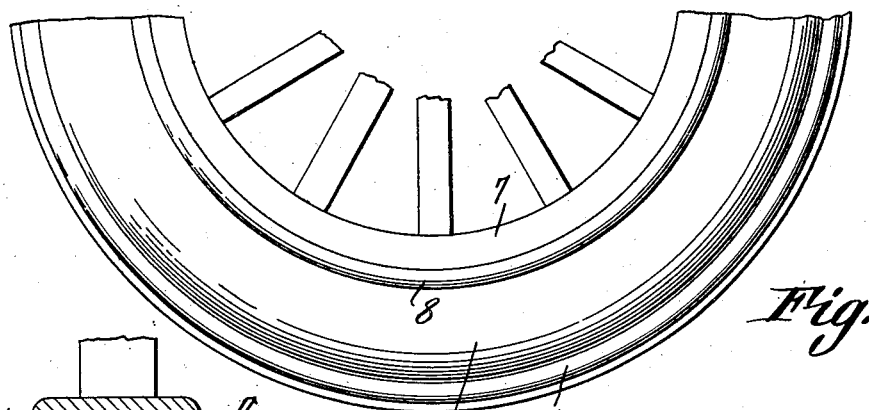
Figure 1 illustrates a view in elevation of a fragment of a pneumatic tire embodying the invention.
Figure 2:
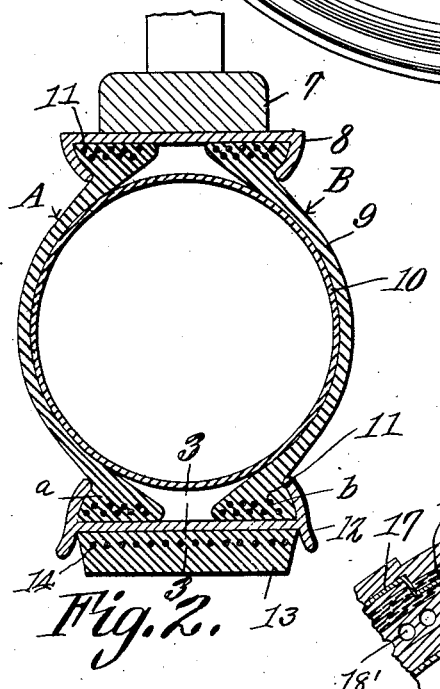
Fig. 2 illustrates a transverse sectional view thereof.
Figure 3:
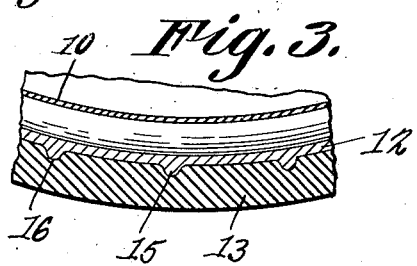
Fig. 3 illustrates a longitudinal sectional view of a fragment of the tire.

In these drawings 7 denotes a felly having any form of rim 8 in which the casing 9 of a pneumatic tire is fitted; 10 indicating the inner tube of the tire. The casing may have beads of any appropriate type to interlock with the rim and as shown in the drawing, the casing is made in two sections A and B, the outer edges of the sections having beads or flanges *a* and *b* respectively, each of which is provided with longitudinally disposed strengthening bands 11 preferably of wire.

The sections of the casing at their outer edges are engaged by a metal rim 12, said metal rim being of a configuration to embrace the beads or flanges of the sections of the casing and hold them in place. A cushion tire 13 is applied to the outer rim and it has binding wires 14 by which it is reinforced and held in place and the said rim has transversely disposed rods 15 which enter grooves 16 in the inner face of the said cushion tire.

By reason of the relation of parts indicated, a solid or cushion tire tread is applicable to a pneumatically supported tube and in using a tire of the construction described and shown, the durability of the cushion tread is combined with the resilient qualities present in tires which are pneumatically supported.

Figure 4:
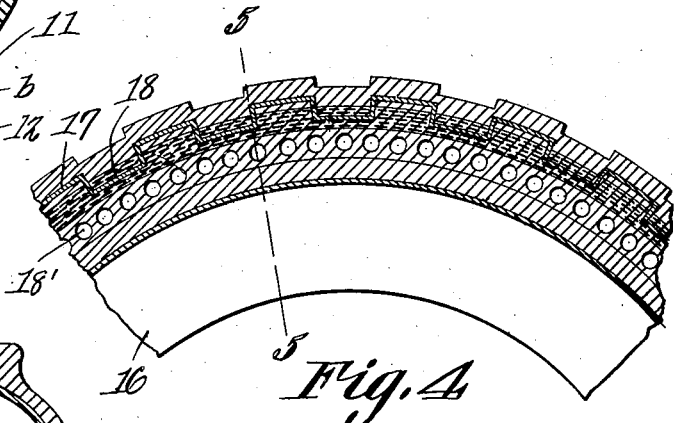
Fig. 4 illustrates a longitudinal sectional view of a modified construction.
Figure 5:
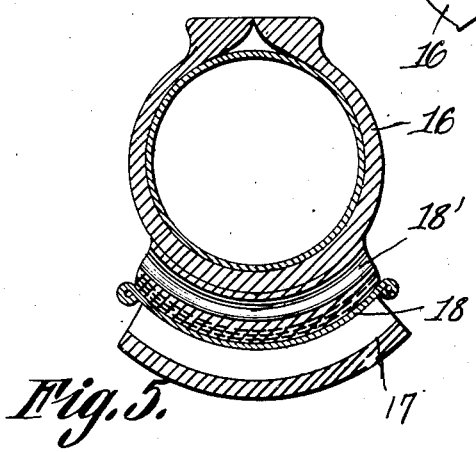
Fig. 5 illustrates a transverse sectional view of such modified construction.

In the modification illustrated in Figs. 4 and 5, I provide a pneumatic tire or casing 16 which may be of any appropriate construction in so far as provision is made for its attachment to a rim of a vehicle wheel and the tread surface of the casing comprises a metal armor which is shaped in irregular contour comprising alternating raised and depressed portions 17 and 18, the former of which constituting the surfaces which engage the roadbed and the latter of which are embedded in a tire fabric comprising layers of rubber and cloth, such as canvas or the like, so that the armor is well embedded and securely fastened to the tire. At the junction of the shoe or casing and the tread extension, there is a series of transversely disposed apertures 18' extending through what would otherwise be a cushion or solid tire or tread attached to or forming a part of what would ordinarily be a tire casing of the construction now commonly employed. By the addition, however, of the added tread with the transversely disposed openings and with the armor described, the casing is rendered practically puncture-proof, friction between the tire and roadbed is increased as compared with the friction of tires having rubber which contacts with the roadbed and while durability of the tire is increased, there is no depreciation in the yielding quality nor the ability to absorb vibration and shock.

I claim:

In a pneumatic tire, a casing, a tread extension on the casing, comprising a tire fabric, a metal armor embedded in the tire fabric comprising alternately elevated and depressed portions, said depressed portions being anchored in the tire fabric and the elevated portions thereof extending into corresponding tread extensions forming a tread surface for the tire, and means for anchoring said armor.

WILLIAM H. HANN.